April 2, 1957 W. R. WEIGHAM 2,787,615
MANUFACTURE OF VISCOSE
Filed Jan. 30, 1953
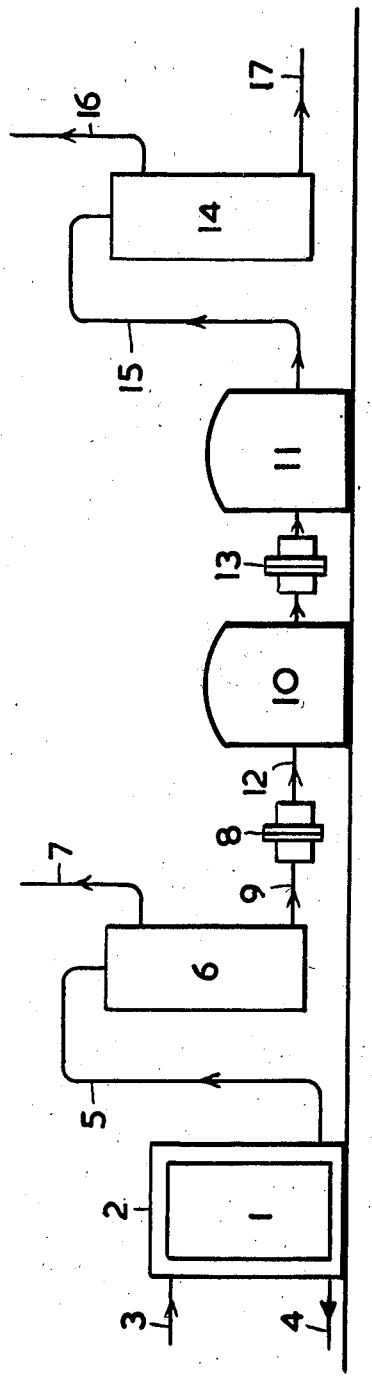

United States Patent Office 2,787,615
Patented Apr. 2, 1957

2,787,615

MANUFACTURE OF VISCOSE

William Reginald Weigham, Coventry, England, assignor to Courtaulds Limited, London, England, a British company Application January 30, 1953, Serial No. 334,327

Claims priority, application Great Britain February 25, 1952

4 Claims. (Cl. 260—218)

This invention relates to the manufacture of viscose suitable for the production of threads, films and the like by spinning or casting the viscose into a coagulating bath. In the manufacture of viscose, cellulose xanthate crumbs are mixed with an aqueous solution of caustic soda in a mixer to form a substantially uniform viscose which is filtered, aged, de-aerated and then passed to a spinning or casting machine. The duration of ageing is dependent on the temperature and a change in temperature of 1° centigrade may alter by several hours the aging period required to bring viscose to its optimum spinning condition. Since some ageing takes place during mixing it is usual to carry out the mixing at substantially the same temperature as the ageing temperature. The mixing temperature is generally controlled by circulating a cooling fluid through a jacket surrounding the mixer or having cooling pipes passing through the mixer.

The object of the present invention is to facilitate the production of viscose.

According to the present invention, a method of preparing viscose comprises mixing cellulose xanthate with dilute caustic soda or water at a temperature higher than the temperature at which the viscose is aged and after mixing the viscose is de-aerated and simultaneously cooled to the desired ageing temperature by subjecting the viscose to a vacuum whilst flowing in a thin sheet. Preferably the viscose is given a second deaeration at the end of the ageing.

In a preferred method according to the invention cellulose xanthate crumbs are mixed with an aqueous solution of sodium hydroxide in a mixer at a temperature higher than that used for subsequent ageing. Where external temperature conditions permit, the mixer is not provided with temperature control means and the contents are allowed to rise in temperature, due to the power input. Alternatively, the mixer may be provided with a jacket through which a heating or cooling fluid is circulated in order to maintain the temperature of the mixer at the required value which according to my process is higher than at the de-aerating and ageing steps. The resulting viscose is passed to a continuous de-aerator of the type in which the viscose flows in a thin sheet through a chamber under vacuum. The viscose is de-aerated and is cooled by the loss of the latent heat of vaporisation to a temperature which is suitable for ageing. A suitable continuous de-aerator is of the type described in Smith Patent 2,714,938 in which viscose flows over a series of conical plates in parallel disposed one below the other, enclosed in a chamber in which a vacuum is maintained.

From the de-aerator, the viscose now at a temperature suitable for ageing, is passed through filters to storage tanks where it is aged in the normal manner. After ageing and before passing to the spinning machines, the viscose is again de-aerated, preferably by means of the de-aerator described in Smith Patent 2,714,938.

By carrying out the formation of the viscose in a mixer without a cooling means, the contents of the mixer reach a temperature of about 23° to 25° centigrade compared with the usual mixing temperature of about 16° to 18° centigrade. During the continuous de-aeration the viscose is cooled from, for example, 23° centigrade, to the desired ageing temperature of, for example, 18° centigrade.

The higher mixing temperature enables a more uniform viscose to be obtained and since the solution is less viscous an economy can be effected in the power required to turn the blades of the mixer.

De-aeration of the viscose after the mixing and prior to ageing prevents the formation of scum due to entrained air bubbles in the storage tanks and also facilitates the second de-aeration after ageing.

A specific example of a method of preparing viscose according to the invention is illustrated by a flow-sheet diagram shown in the accompanying drawing.

Referring to the drawing, cellulose xanthate crumbs and an aqueous solution of sodium hydroxide are mixed in a mixer 1 in which the temperature is allowed to rise due to the power input. The mixer 1 has a jacket 2 through which a heating or cooling fluid may be passed by means of pipes 3, 4. The contents of the mixer are allowed to rise to a temperature of about 23° centigrade and then cooling fluid is circulated through the jacket 2 to maintain the temperature at this value. The viscose is passed by means of a pipe 5 to a continuous de-aerator 6 which is of the type described in the specification of said Smith Patent 2,714,938. The de-aerator 6 is maintained under vacuum through a pipe 7. The viscose passes through the de-aerator 6 in the form of a thin sheet i. e. a laminar flow. The viscose is de-aerated and at the same time cooled to a temperature of about 18° centigrade by the loss of the latent heat of vaporisation.

The viscose substantially free of air passes to a filter 8 by means of a pipe 9 and then passes by means of a pipe 12 to a series of storage tanks (of which two tanks 10, 11 are shown) where it undergoes ageing at a temperature of about 18° centigrade. A second filter 13 is placed between the tanks 10, 11. As the viscose has been de-aerated in the de-aerator 6 substantially no scum forms in the filters 8, 13, the tanks 10, 11 and the pipes 9, 12 due to entrained air bubbles.

When the desired ageing period has elapsed, the viscose passes to a second continuous de-aerator 14 by means of a pipe 15. The de-aerator 14, which is kept under vacuum through a pipe 16, has the same construction as the de-aerator 6 and viscose passing from it by means of a pipe 17 is in the optimum condition for delivery to a spinning machine (not shown).

What I claim is:

1. A method of producing viscose suitable for the manufacture of regenerated cellulose products in which there is the step of mixing cellulose xanthate and dilute caustic soda solution in a first container at a temperature higher than a predetermined temperature to be used in a subsequent ageing step, thereafter the step of causing the viscose to flow continuously in a thin sheet through a vacuum under conditions such that bubbles from the mixing step are boiled off, carrying away the latent heat of vaporization thereby cooling the viscose, and then the step of storing the thus cooled viscose in another container and ageing it at the predetermined ageing temperature.

2. A method of producing viscose suitable for the manufacture of regenerated cellulose products in which there are the steps of mixing cellulose xanthate and dilute caustic soda solution by stirring in a mixer thereby causing a rise in temperature and a temporary lowering of the viscosity; thereafter removing the viscose from the mixer and causing it to flow continuously in a thin sheet through a vacuum under conditions such that air bubbles from the mixing step are boiled off, carrying away latent heat of vaporization thereby cooling the viscose to a lower temperature for ageing; and then storing the thus cooled viscose in another container for ageing at that lower temperature.

3. A method of producing viscose suitable for the production of regenerated cellulose products in which cellulose xanthate is dissolved in caustic soda solution by stirring them together in a mixer at a temperature about 5° C. higher than the desired ageing temperature which facilitates the stirring and mixing by lowering the viscosity; thereafter causing laminar continuous flow of the viscose outside the mixer at reduced pressure producing boiling off of air bubbles formed at the mixing stage without application of heat and simultaneously cooling the viscose to the desired ageing temperature by the loss of latent heat carried off by the bubbles; and then ageing the viscose in another container at that ageing temperature.

4. A method of producing viscose suitable for the production of regenerated cellulose products according to claim 1 in which the viscose is subjected to a second de-aeration after it is aged.

References Cited in the file of this patent

UNITED STATES PATENTS

| | | |
|---|---|---|
| 986,306 | Naudin | Mar. 7, 1911 |
| 1,984,285 | Richter | Dec. 11, 1934 |
| 2,019,944 | Walch | Nov. 5, 1935 |